A. DRUMMOND.
HEADSTOCK OF LATHES.
APPLICATION FILED JULY 27, 1921.

1,424,629.  Patented Aug. 1, 1922.

UNITED STATES PATENT OFFICE.

ARTHUR DRUMMOND, OF RYDES HILL, NEAR GUILDFORD, ENGLAND.

HEADSTOCK OF LATHES.

1,424,629.  Specification of Letters Patent.  Patented Aug. 1, 1922.

Application filed July 27, 1921. Serial No. 487,977.

(GRANTED UNDER THE PROVISIONS OF THE ACT OF MARCH 3, 1921, 41 STAT. L., 1313.)

*To all whom it may concern:*

Be it known that I, ARTHUR DRUMMOND, a subject of the King of Great Britain, residing at Rydes Hill, near Guildford, in the county of Surrey, England, have invented certain new and useful Improvements in or Relating to the Headstocks of Lathes (for which I have filed an application in Great Britain, April 16, 1919, Patent No. 138,231), of which the following is a specification.

This invention relates to detachable head stocks of lathes of small or moderate size, below say 9 inch centres, and has for its chief object to strengthen the head stock while at the same time allowing the maximum size of pulleys to be employed.

In lathes of small or moderate size the head stock usually provided is frequently much weakened at the lower side in order to provide sufficient space for pulleys of the requisite dimensions, and, to give sufficient strength, the frame of the head stock is sometimes completed by a limb connecting the two ends at the upper side.

According to this invention, in order to increase the strength of the lower side of the head stock and to enable the strengthening limb to be dispensed with I form the base with a deep longitudinal web or rib, preferably placed centrally and extending into a channel in the lathe bed. This web gives considerable depth to the base of the head stock and allows the recess receiving the usual stepped pulley to be extended downwardly to within a short distance of the level of the lathe bed, as the base of the head stock, while it is reduced to a comparatively thin member at the deepest part of the recess, is sufficiently strengthened by the central web, which projects from its lower face, to provide the necessary rigidity. The web or rib may be straight or may be curved in side elevation so as to provide the maximum strength at the part which is most weakened by the pulley recess.

In order that the said invention may be clearly understood and readily carried into effect the same will now be described more fully with reference to the accompanying drawings, in which:—

Figure 1:
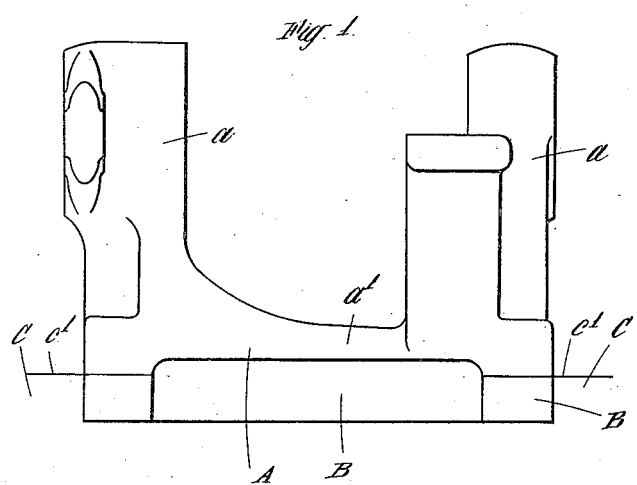
Figure 2:
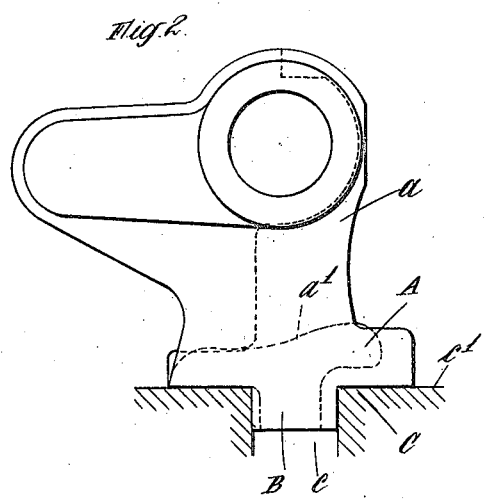

Figure 1 shows in side elevation a head stock formed in accordance with this invention; and Figure 2 is an end elevation of the head stock.

A is the base of the head stock, having the two limbs $a$ between which is mounted the stepped pulley in bearings at the upper end of the limbs. B is the deep longitudinal web or rib on the under side of the base A. C is the lathe bed formed with the channel $c$ into which the web B projects.

The base A of the head stock is, as shown in Figure 1, reduced to a comparatively thin portion at $a'$ so as to provide the maximum space for the larger end of the pulley, which therefore can extend downwardly to within a short distance of the upper surface $c'$ of the lathe bed. The web B is shown straight but may be of curved form, following approximately the outline of the upper surface of the base A so as to provide the greatest depth below the thin portion $a'$ of the base. The base A is thus strengthened throughout its length and there is no need to compensate for any reduction in strength at the thinner part by employing a top limb connecting the end limbs $a$.

What I claim and desire to secure by Letters Patent of the United States is:—

A detachable headstock for lathes, comprising a base, a pair of stepped pulley carrying limbs cast in one piece with the base, between which limbs the base is reduced in thickness from one limb to a minimum near the second limb, and a deep longitudinal rib on the underside of the base, adapted to give the requisite rigidity to the base at the part of reduced thickness.

ARTHUR DRUMMOND.